July 22, 1930.  C. L. MARTI  1,771,226
ELECTRICAL CONDENSER
Filed March 6, 1926
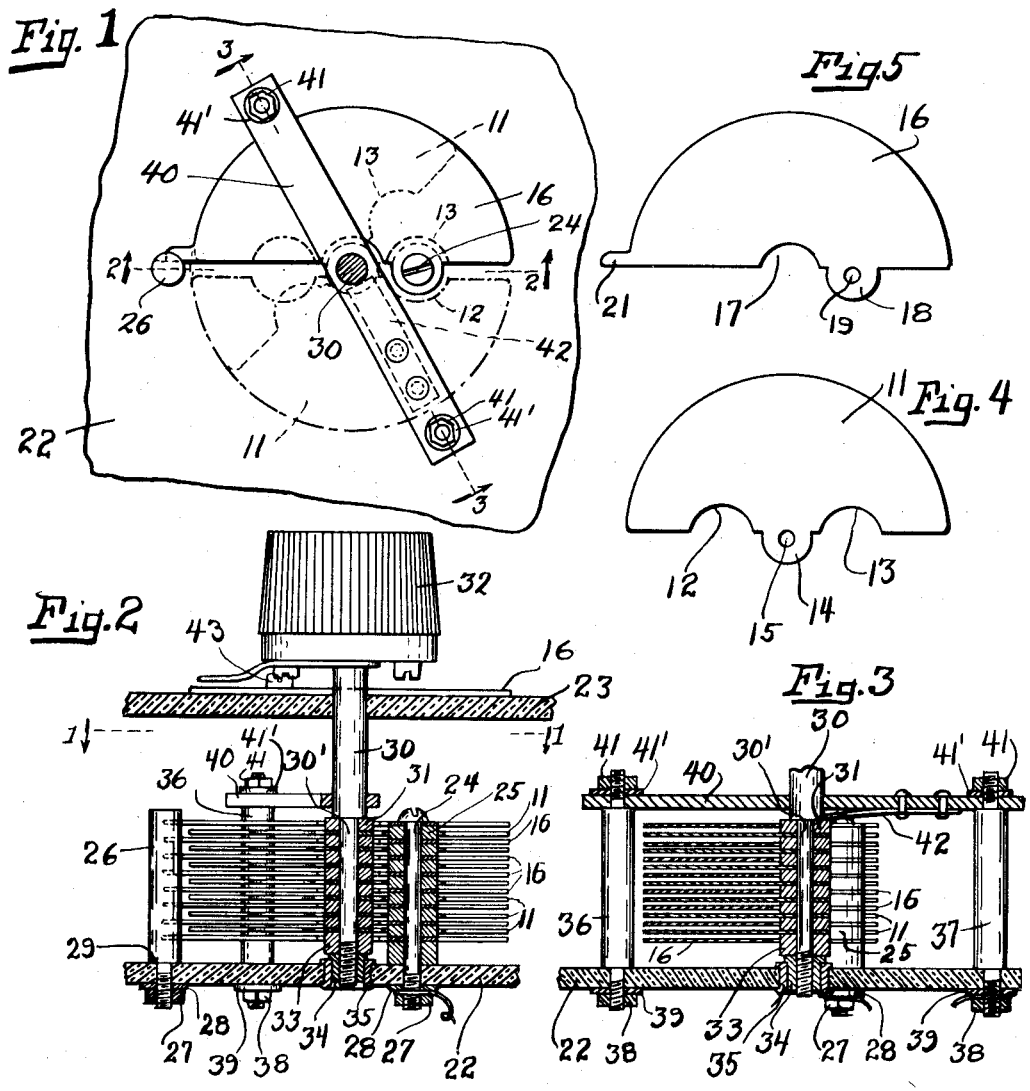

Patented July 22, 1930

1,771,226

UNITED STATES PATENT OFFICE

CHARLES L. MARTI, OF ORANGE, NEW JERSEY

ELECTRICAL CONDENSER

Application filed March 6, 1926. Serial No. 92,710.

My invention relates to electrical apparatus and more particularly to variable condensers for use in radio broadcast receiving sets.

It is one object of my invention to provide a compact structure whereby the overall size of a condenser is reduced for any given capacity.

It is a further object of my invention to provide a condenser structure wherein the rotor shaft and the mounting for the stator plates are in the same plane and within the diameter of the condenser plates.

It is a further object of my invention to provide a structure and method of assembly of the parts whereby elements that introduce electrical losses are eliminated.

It is a further object of my invention to provide a method of mounting the condenser unit whereby an even tension is maintained at all times and all points of engagement between the rotor and stator plates of the condenser.

It is a further object of my invention to provide a condenser wherein one of the end stator plates is separated from and mounted on the opposite side of the panel from the remainder of the condenser.

In general it is the object of my invention to provide a variable condenser that may be constructed and assembled at low cost, and which may be conveniently assembled into a radio broadcast receiving set.

Other objects of my invention will appear from the accompanying drawings, wherein—

Figure 1 is a top plan view of one embodiment of my invention, taken on the line 1—1 of Fig. 2;

Fig. 2 is a view partly in vertical section of the condenser of my invention, the section being on the line 2—2 in Fig. 1;

Figure 3 is a partial view of my condenser in vertical section on the line 3—3 of Fig. 1;

Figs. 4 and 5 are plan views of the rotor and stator plates respectively of my condenser.

Referring to Figs. 4 and 5, it will be noted that the rotor plates 11 are substantially semi-circular in shape and each is provided with two cut-away or reentrant portions 12 and 13 and a tongue 14 located at the center of the plate and having an aperture 15 therein. The cut-away or reentrant portions 12 and 13 are identical in size and shape and are spaced equally on either side of the aperture 15. The stator plates 16 are likewise substantially semi-circular in shape and preferably of the same diameter as the rotor plates. Each plate 16 is provided with a cut-away or reentrant portion 17 at its center, a tongue 18 having an aperture 19 therein, said tongue being off-set to one side of the center of said plate, and a lip 21 extending laterally from the periphery of the plate.

Fig. 2 illustrates my proposed method of assembling the stator and rotor plates into a unit and into a radio broadcast receiving set. A panel 22, which may be termed the lower panel of the set and a panel 23 which may be termed the upper panel thereof, is all of the set that need be shown for the purposes of this application.

The desired number of stator plates, here shown as eight, are assembled together or connected by means of a bolt 24 which passes through the apertures 19 in the stator plates. Each of the plates is spaced from the other and held apart by means of a metallic washer 25 that also fits upon the bolt 24. To assist in maintaining the same spaced relation of the plates over the entire area thereof, the lips 21 of the plates 16 are embedded in similarly spaced transverse slots in a post 26. The bolt 24 and post 26 extend through and are secured to the lower panel 22 of the radio set by means of nuts 27 and lock washers 28. The post 26 has a shouldered portion 29 which engages one side of the panel 22, while a plurality of washers 25 are used on the bolt 24 between the lowermost plate 16 and the panel 22. If the bolt 24 is metallic, the electrical circuit connection to the rotor may be attached under the nut 27 and the bolt 24.

The rotor plates are mounted upon a shaft 30 that extends through the top panel 23 and is mounted in the lower panel 22 as will be more fully hereinafter described. The shaft 30 has a reduced portion 30' that extends through the apertures 15 in the plates 11. The plates 11 are separated and held spaced from each other by means of washers 31, that are likewise mounted on the shaft 30. The uppermost of the washers 31 engages the shoulder between the portions 30 and 30' of the shaft.

At its lower end the shaft 30' is screw threaded and is provided with a pair of nuts 33 and 34. Nut 33 engages the lowermost rotor plate thus compressing the washers and plates into one rotatable unit as the nut is adjusted on the shaft 30'. Nut 34 acts as a lock nut for nut 33. Nut 34 is reduced in size and is adapted to be loosely received in an eyelet 35 fastened in the lower panel 22.

The shaft 30 turns freely in the upper panel 23, and carries a knob 32, and since the nut 34 is tight on the shaft 30' and loose in the eyelet 35, the nut will act as a bushing in the eyelet 35 to permit ready rotation of the rotor.

It will be noted that the central longitudinal axes of the bolt 24 and shaft 30' are in the same plane but offset from each other, the bolt 24 being within the diameter of the plates of the condenser and extending across the path of the rotor plates thereof. This arrangement of parts permits of a compact assembly with low capacity losses. The full areas of the plates are effective. Also by reason of the fact that the cut-away or reentrant portions 17 of the stator plates are arranged so as to receive the spacers 31 for the rotor plates, and the cut-away portions 12 and 13 are arranged to receive the spacers 25 in both extreme positions of the stator plates, a further reduction in space occupied and capacity losses is obtained. When the stator and rotor are completely engaged or interleaved, the cut-away portions 13 partially embrace the spacers 25 so that the straight edges of the interleaved plates are aligned. When the rotor plates are entirely disengaged from the stator plates, no space is wasted in the radio set because the cut-away portions 12 will partially embrace the spacers 25 for the stator plates. The cut-away portions 12 and 13 are preferably equal in size and spaced equally on either side of the center of rotation of the plate.

After assembly it becomes necessary to adjust the spacing between the rotor and stator plates when interleaved. It is also desirable to place a certain tension on the rotor so that it will retain by friction the position to which it may be adjusted. These features are accomplished in the present condenser in the following manner.

Two posts 36 and 37 are secured on the lower panel 22, as shown in Figs. 1 and 3, by means of nuts 38 and lock washers 39. The upper ends of the posts are reduced to form a shoulder upon which rests a cross brace 40 provided with an aperture adapted to receive the shaft 30 and thereby function as a center bearing therefor. Nuts 41 and 41' secure the brace 40 in place.

The member 40 has riveted thereto a leaf spring 42 which is bowed and adapted to engage the uppermost washer or spacer 31 on the rotor shaft, thus exerting a downward pressure thereon.

When the rotor is assembled in place, this downward pressure is taken up by means of the nut 33 which screws onto the lower end of the shaft 30' and engages the lowermost of the rotor plates. As the nut 33 is adjusted on the shaft 30', the proper spacing of the rotor plates with respect to the stator plates is accomplished and at the same time the desired frictional tension is applied to the rotor. Once the desired positioning of the plates is obtained, the nut 34 is adjusted in place on the end of the shaft 30' to constitute the lock nut for the nut 33.

If the post 36, the brace 40, the spring 42 and the shaft 30, 30' are metallic, the circuit connection to the rotor may be attached to the post 36 as shown in Fig. 3.

In the mounting of the condenser in the radio set, the tip 21 of one of the stator plates is removed therefrom and the plate is mounted on the upper panel 23 and secured in place by a bolt 43. It will be noted that the head of the bolt 43 extends above the top of the panel.

On the bottom of the knob 32 are located two screws 45 on opposite sides of the shaft 30, the heads of which project downwardly and are adapted to be in the arc of a circle passing through the bolt 43 and to respectively engage the bolt 43 so as to constitute the stops for the turning movement of the rotor. In addition to constituting the stops for the rotor, one of the screws 45 also holds a pointer 46 in place on the bottom of the knob. The pointer is adapted to cooperate with a scale which may be etched or engraved on the plate 16 that is secured on the upper panel 23 so as to facilitate logging the readings of the condenser settings.

Modifications may be made in the arrangement and location of parts within the spirit and scope of my invention and such modifications are intended to be covered by the appended claims.

I claim:

1. A variable condenser comprising a plurality of rotor plates each having an aperture therein and two cut-away portions on opposite sides thereof, a rotatable shaft extending through the apertures of said plates, means for securing said plates to said shaft so as to rotate therewith, a plurality of stator plates each having a cut-away portion adapted to receive said shaft, and means for holding said stator plates in spaced relation to each other so that the rotor plates may be interleaved therebetween, said means being adapted to fit into one of the rotor cut-away portions when the rotor and stator plates are interleaved so that the edges of said plates are substantially aligned in this position.

2. A variable condenser comprising a plurality of semi circular rotor plates each having an aperture in the center thereof and two cut-away portions spaced equally on opposite sides thereof, a rotatable shaft extending through the apertures of said plates, means carried by said shaft for spacing said plates apart, means for securing said plates to said shaft so as to rotate therewith, a plurality of stator plates each having a cut-away portion adapted to receive said shaft, means for holding said stator plates and spaced from said shaft the same distance as the cut-away portions in said rotor plates, and means for spacing said stator plates apart so that the rotor plates may be interleaved therebetween.

3. A variable condenser comprising a plurality of rotor plates each having a cut-away portion therein, a rotatable shaft, means for securing said plates to said shaft so as to rotate therewith, a plurality of stator plates having a cut-away portion adapted to partially receive said shaft, and means for holding said stator plates, the cut-away portions of said rotor plates being adapted to partially receive the last mentioned means.

4. In a variable condenser the combination with a plurality of stator plates, a mounting therefor, a plurality of rotor plates adapted to interleave with said stator plates, and a rotatable shaft cooperating with said rotor plates, of a cross brace, a mounting therefor, resilient means mounted on said cross brace and adapted to exert pressure in one direction on said rotor plates, means for adjusting the position of said rotor plates with respect to said stator plates and thereby also produce frictional tension on said rotor, and means for locking said adjusting means in its adjusted position.

5. A variable condenser comprising a plurality of stator plates, a plurality of rotor plates adapted to be interleaved therebetween, a rotatable shaft adapted to be secured to said rotor plates. means for rotating the same, and a mounting for said condenser comprising a lower panel, metallic means for securing said stator plates thereto, a metallic cross piece in which said shaft is mounted, metallic means for securing said cross piece to said panel, an upper panel constituting an upper bearing for said shaft, and means cooperating with said securing means and adapted to receive the terminals of an electrical circuit.

6. A variable condenser comprising a plurality of stator plates, a plurality of rotor plates adapted to be interleaved therebetween, a rotatable shaft adapted to be secured to said rotor plates, a knob thereon for rotating the same, and a mounting for said condenser comprising a lower panel, means for securing said stator plates thereto, an upper panel spaced from the lower panel and constituting an upper bearing for said shaft, one of said stator plates being mounted on said upper panel, headed means for securing the same in position, and a pair of screws secured in said knob on opposite sides of said shaft and adapted to contact with said headed means to constitute stops for the movements of said rotor.

7. A variable condenser comprising a plurality of stator plates, a plurality of rotor plates adapted to be interleaved therebetween, a rotatable shaft adapted to be secured to said rotor plates and a knob thereon for rotating the same, and a panel through which said shaft extends, a dial mounted on the opposite side of said panel from said condenser having a scale thereon, headed means for securing the dial in position, a pointer carried by said knob and adapted to cooperate with said scale and means carried by said knob on opposite sides of said shaft and adapted to cooperate with said headed means to constitute the stops to limit movements of said rotor plates.

8. A variable condenser comprising a series of stator plates, a series of rotor plates mounted to interleave therewith, connecting means for said stator plates extending across the path of said rotor plates, each of said rotor plates having an edge provided with spaced reentrant portions positioned to engage said connecting means, one in one extreme position of the rotor plates and the other in the opposite extreme position of the rotor plates.

In testimony whereof I affix my signature.

CHARLES L. MARTI.